Figure 1:
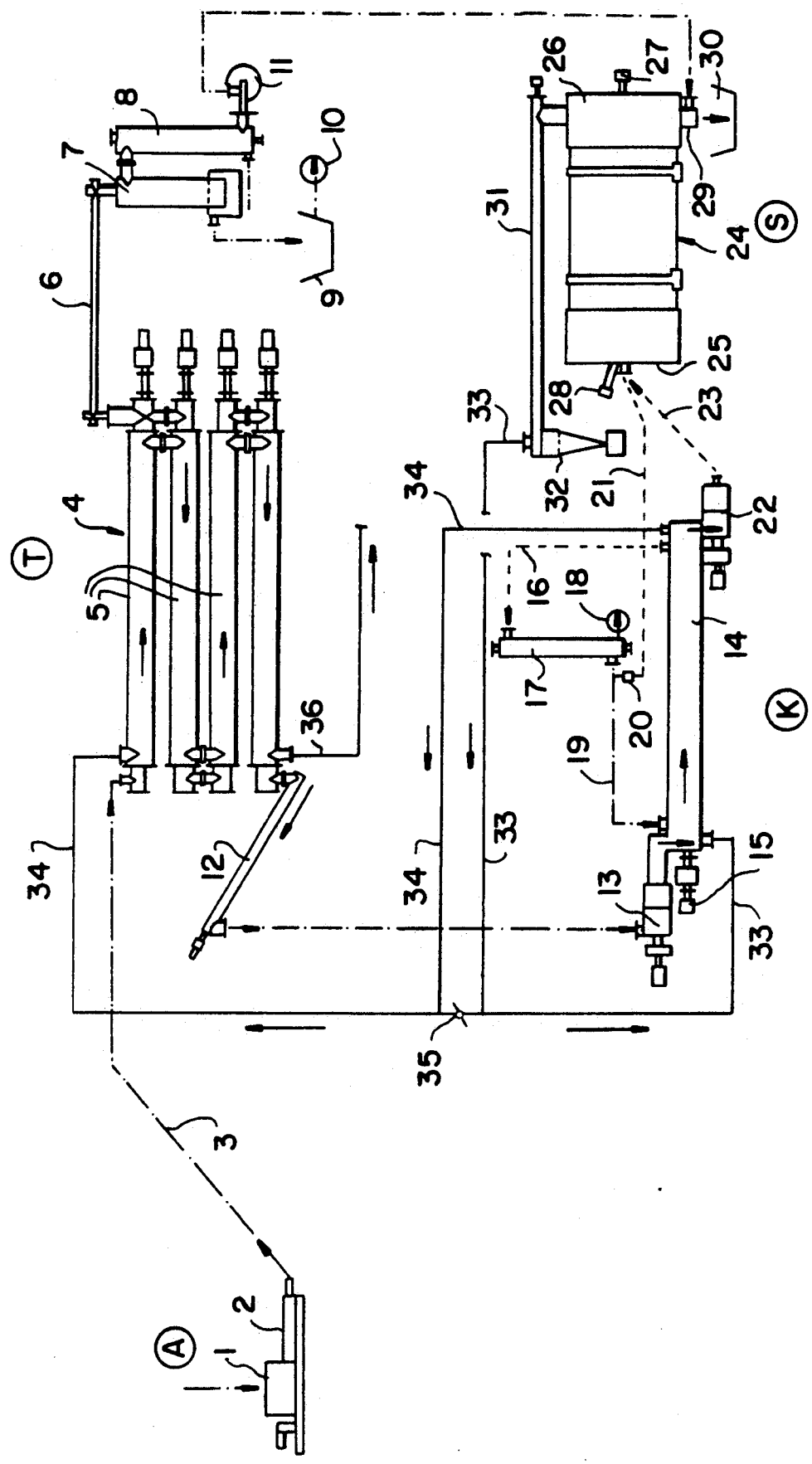

United States Patent [19]
Aicher

[11] Patent Number: 5,246,599
[45] Date of Patent: Sep. 21, 1993

[54] METHOD AND ARRANGEMENT FOR TREATMENT OF SEWAGE SLUDGE

[76] Inventor: Max Aicher, Teisenbergstrasse 7, 8228 Freilassing, Fed. Rep. of Germany

[21] Appl. No.: 734,197

[22] Filed: Jul. 22, 1991

[30] Foreign Application Priority Data

Sep. 1, 1990 [EP] European Pat. Off. ........ 90116810.4

[51] Int. Cl.⁵ ............................................. B01D 35/18
[52] U.S. Cl. .................... 210/774; 210/768; 210/770; 210/180; 210/181
[58] Field of Search ............... 210/774, 768, 770, 771, 210/180, 181, 195.1

[56] References Cited

U.S. PATENT DOCUMENTS

| | | | |
|---|---|---|---|
| 3,275,547 | 9/1966 | Buckstee et al. | 210/768 |
| 3,803,806 | 4/1974 | Komline, Sr. | 210/774 |
| 3,875,357 | 4/1975 | Foster et al. | 210/774 |
| 4,013,516 | 3/1977 | Greenfield et al. | 210/774 |
| 4,618,735 | 10/1986 | Bridle et al. | 201/117 |
| 4,769,157 | 9/1988 | Bässler et al. | 210/774 |
| 4,781,796 | 11/1988 | Bridle et al. | 201/21 |

FOREIGN PATENT DOCUMENTS

| | | | |
|---|---|---|---|
| 1075003 | 4/1980 | Canada . | |
| 0343431 | 11/1989 | European Pat. Off. | 210/774 |
| 0347808 | 12/1989 | European Pat. Off. . | |
| 2-253900 | 10/1990 | Japan | 210/768 |

OTHER PUBLICATIONS

Derwent Abstract EP347808-A, Jun. 19, 1989.

Primary Examiner—Robert A. Dawson
Assistant Examiner—Ana Fortuna
Attorney, Agent, or Firm—Akoo-Toren

[57] ABSTRACT

In a treatment or processing or sewage sludge in the sense of recycling, where the sewage sludge is to begin with dried (T), subsequently converted (K) under anaerobic conditions at approximately 250° to 350° C. and finally is sintered at at least 1250° C. in successive steps, it is proposed to perform all process steps including the conveyance of the commodity to be processed between the individual processing steps successively in continuous passage in a closed system. Only the vapors are removed in this system in the drying stage (T) and the conversion gases in the conversion stage (K) and they are condensed; the heat quantity contained in the flue gas generated during the sintering process (S) is utilized for heating to begin with the conversion stage (K) and after that the drying stage (T). Because the flue gases are used for heating the processing steps in the sequence of the naturally occurring temperature gradient, the processing of the sewage sludge is achieved so as to be nearly self-sufficient as far as the energy requirement is concerned, meaning the energy required for the processing is largely supplied by the calorific value of the organic ingredients contained in the sewage sludge itself. Because the sewage sludge is processed in a closed system, nefarious effects upon the environment are avoided.

12 Claims, 2 Drawing Sheets

METHOD AND ARRANGEMENT FOR TREATMENT OF SEWAGE SLUDGE

The invention deals with a method for treatment of sewage sludge, where the sewage sludge, after a mechanical preliminary drainage process, is to begin with dried in consecutive treatment steps, thereupon subjected to a conversion under anaerobic conditions at approximately 250° to 350° C. and finally is calcined at at least 1250° C., as well as with an arrangement for performing this method.

Sewage sludge is an unavoidable product of the biological waste water clearing arrangement; its removal poses increasing problems. Sewage sludge contains, depending upon composition and treatment of the waste water, in addition to the organic share of 20 to 60% consisting mainly of a biomass of bacterial origin, on the average approximately 60% of inorganic ingredients. Contrary to a biomass of plant origin, lipoids are scarcely ever found in sewage sludge and carbohydrates only in small amounts, instead however lipids and proteins as main components.

The amount of liquid sewage sludge from households and industry accumulating every year continues to increase; in the Federal Republic of Germany for instance it amounted in the year 1986 to approximately 50 million of cubic meters with approximately 4.6% of dry mass content. Of this overall quantity only approximately one third can be made use of, meaning it can be spread upon agriculturally usable surfaces either directly or after composting; the largest part of the sewage sludge is treated as waste, wherein approximately 60% are directly dumped in the open air and approximately 7% are thermally treated and the residual products are dumped.

Apart from the yearly yield of sewage sludge continuing to increase, because additional portions of the population are provided with sewage plants, and because the quality requirements of the waste water clearing continue to increase, none of these type of treatments are without their problems. It has to be added that in view of the limited capacity and the relative increase of noxious substances in the sewage sludge, the agriculturally useful share of the total yield will diminish absolutely and relatively.

In recycling of sewage sludge the quality requirements are very high, above all as far as epidemic hygiene and chemical substances contained therein are concerned. In order to be spread on agriculturally usable surfaces sewage sludge must be decontaminated; this can only be achieved in the course of long reaction periods and/or at high temperature in a biological, physical or chemical process, not however by means of the usual sewage sludge fermentation. In addition sewage sludge has not only a relatively high content of poisonous heavy metals, rather also a high content of dioxin, so that it cannot be immediately used as agricultural fertilizer.

Essentially mechanically dehydrated sewage sludges and residual substances are dumped after burning. Apart from the circumstance that dumping grounds will become rarer and rarer in the future, the practice of dumping itself is questionable, since the sludges often cannot be dumped if soil mechanism criteria are taken into account.

Against this background a method for treating sewage sludge has become known, where the sewage sludge to begin with is dried to achieve as high a share of dry substance and is thereupon subjected to a fractionating pyrolysis (EP-A 0 347 808). Herein to begin with the organic carbon contained in the sewage sludge is separated out in the form of oil in the course of a low temperature conversion under anaerobic conditions at approximately 250° to 350° C. The residues remaining afterwards are calcinated at at least 1250° C. with addition of pure oxygen. Hereby the last carbon residues are burned, so that only the inorganic ingredients still remain which amount to 10 to 15% of the original sewage sludge volume; these can be utilized either as lightweight aggregate in the fabrication of concrete or, since they have hydraulic properties if finely ground, as a substitute for a hydraulic binder agent, especially for Portland cement.

This known method of fractionated pyrolysis of sewage sludge does not only result in a complete utilization of the organic ingredients contained in sewage sludge, also as far as the energy contained therein is concerned, rather also in the remaining inorganic ingredients not having to be dumped. The thus conducted fractionated pyrolysis has the additional advantage that the heavy metals are not separated during the treatment, rather they remain in the inorganic residual mass, where they are present in the form of oxides after the sintering process, thus in a form corresponding to their natural existence so that the danger of their again entering the biological cycle through erosion no longer exists. An essential advantage of this known method however also lies in that through sensible utilization of the high energy content of sewage sludge a largely energy self-sufficient, meaning a method of operation essentially independent of external addition of energy, is possible in spite of the high energy requirement. While this known method as it were supplies the theoretical background for a practically complete recycling of sewage sludge with almost no effect on the environment, the invention is based upon the task of indicating a possibility of its performance in actual practice.

The invention solves this task as far as the method is concerned in that all method or process steps including the conveyance of the commodity to be processed or treated in between the individual process steps is performed in a continuous consecutive passage in a closed system, from where merely the vapors are removed and condensed during the drying stage and the conversion gas in the conversion stage and in that the heat quantity contained in the flue gas obtained during the burning or calcination process is utilized for supplying the conversion stage and the drying stage with heat. The flue gas is expediently used as heating gas in continuous flow directed for heating first the installations for conversion and after that the installations for drying. Herein the flow of heating gas is conducted in the individual processing steps parallel to the conveyance direction of the commodity to be processed and in the same direction, so that at the start of the respective processing stage respectively the highest heating gas temperature is available for heating.

A slight negative pressure is advantageously maintained in the entire processing- and conveying system when performing the method. The commodity to be processed is expediently conveyed in a constrained manner on the conveyance travel between the individual processing steps, for instance by means of a worm conveyor.

The method in the invention enables a continuous processing of predehydrated sewage sludge with separation of the intermediate products up to the sintering of the inorganic ingredients contained therein in a completely closed system; especially if the system is kept at a slight negative pressure, there is also no danger that any noxious substances harmful to the environment are emitted.

By the use of the flue gases obtained during the sintering process for heating the processing steps in the sequence of the naturally occurring temperature gradient because of release of the heat quantity contained in the flue gas up to the final exhaust gas temperature of about 50° C., the treatment or processing of sewage sludge is accomplished mearly self-sufficiently as far as energy requirements are concerned, meaning that the energy required for the processing is largely drawn from the calorific value of the organic ingredients contained in the sewage sludge itself. The supply of pure oxygen is only required for the sintering process, whereby not only the temperature necessary for sintering the inorganic ingredients is achieved with combustion of the carbon still contained in the commodity to be processed after the conversion step, rather the combustion of additional non-regenerative energy carriers is also avoided. Hereby not only the generation of additional carbon dioxide is avoided, rather above all nitrogen oxides are avoided which have a harmful effect upon the environment.

An arrangement for performing the method is also the subject of the invention. It is distinguished by the circumstance, that the drying stage as well as the conversion stage comprise respectively at least one pipe-shaped processing unit heatable by combustion gas with devices for continuous conveyance of the commodity to be processed, which are connected by closed conveyance lines with each other and with the cylindrical rotary kiln for performing the combustion or calcinating process. Herein a device for mechanical dehydration of the sewage sludge can be positioned upstream of the drying stage.

A positive or constrained conveyor, for instance twin worm conveyors, is provided expediently for conveying the commodity to be treated or processed between the individual processing stages.

In the drying stage several processing units are expediently arranged consecutively and respectively connected with each other at the ends for conveying the commodity to be processed. The processing units can be combined into a drying battery one on top of the other with respectively reversed conveying direction.

Each processing unit of the drying stage consists expediently of an inner conveyance pipe for the commodity to be processed in which a conveyance worm is arranged so as to be able to rotate. The conveyance pipe is advantageously surrounded by an external jacketing pipe, wherein the annular hollow space formed between the conveyance pipe and the jacketing pipe can be bathed by combustion gases.

A helically-shaped heating duct is formed in the annularly-shaped cavity by means of a ring-shaped helix closing off said cavity in transverse direction. The conveyor worm itself can consist out of annularly-shaped helix, which is attached by radial webs to a centrally driven axis. A heat insulating jacketing can be arranged at the external circumference of the jacket pipe.

The advantage of this part of the invention consists above all in that a compact installation with short conveyance paths is formed by the consecutive arrangement of the individual processing stages, which conveyance paths comprise positive conveyors in a particularly advantageous manner, so that disturbances during passage of the commodity to be processed are avoided. It is furthermore advantageous that the processing of the sewage sludge is performed in continuous passage in the individual processing stages, so that the conveyance paths proper can be reduced to a minimum within the installation or arrangement.

Figure 2:
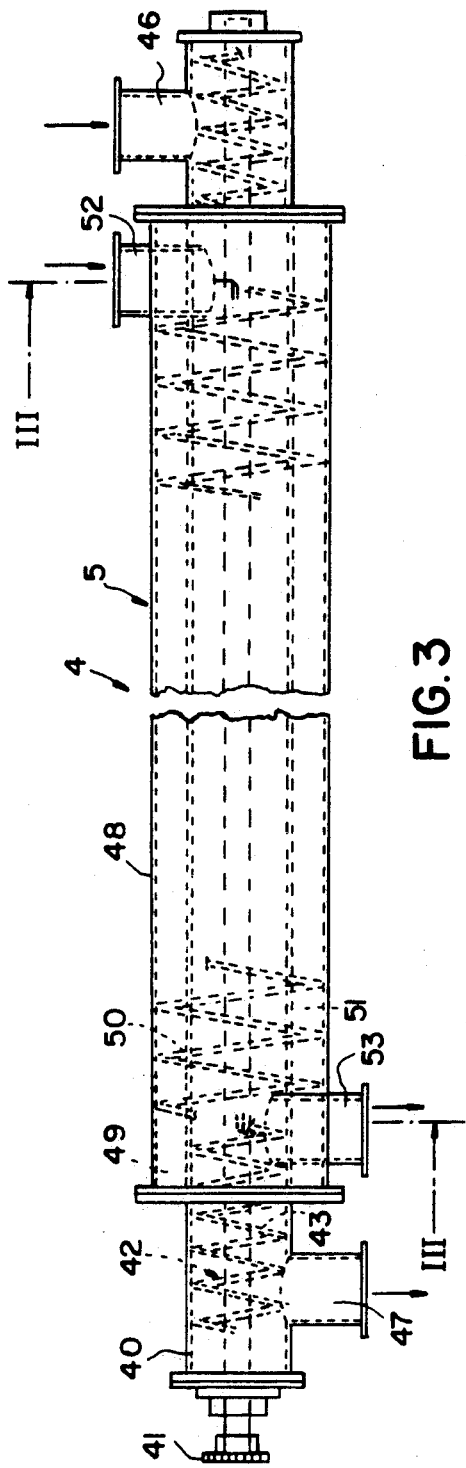
Figure 3:
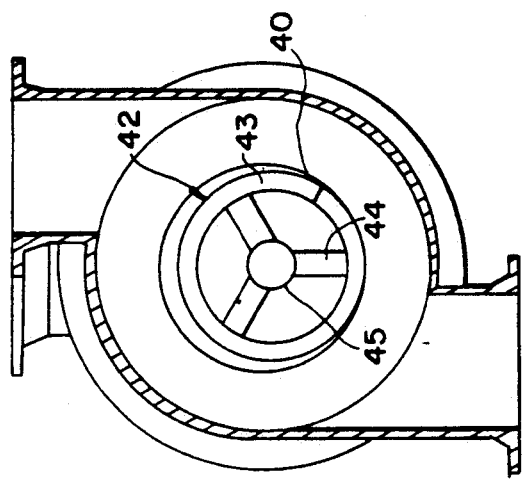

In the following the invention is described with particularity with the help of the drawing. It is shown on:

FIG. 1—a diagrammatic illustration of the arrangement in the invention for processing sewage sludge, FIG. 2—a longitudinal section through one processing unit of the drying stage and FIG. 3—a cross-section along the line III—III in FIG. 1.

The method in the invention and an arrangement for its performance can be explained with the help of the diagrammatic overview shown in FIG. 1.

The arrangement comprises to begin with a charging station A with a inlet funnel 1 for charging sewage sludge previously dehydrated to about 20 to 30% of dry substance, which then is then is further dehydrated in an also mechanical manner to a solid substance content of approximately 50%.

The thus predehydrated sewage sludge is supplied to a drying stage T by means of a solid matter pump 2 in direction of the arrow through a conveyor line 3 shown only diagrammatically, where the sewage sludge passes again in direction of the arrow through several heatable drying units 5 arranged consecutively in a drying battery 4; the construction of the drying units 5 will be explained in detail later. The vapors are evacuated from the drying stage T through a line 6 and are fed to a vapor cleaner or washer 7 as well as to a condenser 8. The condensate arrives from the condenser 8 into a recovery container 9, from where it can be drawn off by a condensate pump 10. A fan 11 connected to the condenser 8 conducts the gases away and produces simultaneously a negative pressure in the entire system.

The commodity to be processed having passed through the drying stage T arrives then to the conversion stage K through an intermediate conveyor 12 which is expediently laid out as a positively conveying twin worm. Once in the conversion stage K the material reaches the converter 14 proper through a charging device 13 which also comprises a positively conveying twin worm by means of which the material to be processed is transported in direction of the arrow until it arrives in the converter 14 proper.

The converter 14 is designed in a manner known as such and therefore needs no specific description. It comprises a conveyance arrangement preferably again a positively conveying twin worm in a drum driven by a drive 15. In the converter 14, the material to be processed is heated to a temperature of approximately 250° to 350° C. Since anaerobic conditions must be maintained in the converter 14, the conveyor arrangement must be sealed at the ends. In the course of the so-called low temperature conversion under anaerobic conditions there are formed oils with a comparatively high share of carbon and a high combustion heat, and carbon as a side product out of the lipids and proteins contained in the sewage sludge, which is analogous to the formation of oil and coal in nature.

The conversion gases are separated out of the converter 14 through a line 16 and fed to a condenser 17. The oil produced during condensation can be drawn away by an oil pump 18; the residual gases are again returned to the converter 14 through a line 19. A possibly generated overpressure can be conveyed through a pressure relief valve 20 and the line 21 directly to the sintering stage S arranged downstream.

The material to be processed, from which the volatile organic ingredients have been removed in the conversion stage K, reaches then the sintering stage S through an outlet device 22 and possibly an additional intermediate conveyor 23. The sintering stage S comprises a cylindrical rotary kiln 24 of usual construction, into which the residues of the low temperature conversion are fed on the input side 25. The cylindrical rotary kiln 24 is provided with a gas-oxygen burner 27 on the output side 26; oxygen in technically pure form can be supplied on the input side to a lance 28. The residual carbon still contained in the material to be processed is burned up with addition of this oxygen. Thereby a temperature of at least 1250° to 1400° C. is produced, by means of which sintering of the then solely existing inorganic ingredients of the sewage sludge is initiated. The sintered end product reaches a container 30 through an output device 29 from which it can be drawn off.

Parallel to the previously described travel of the sewage sludge is the travel of the flue gas generated during sintering in the cylindrical rotary kiln 24. The flue gas as drawn out of the kiln 24 through a line 31 and is supplied through a cyclone 32 for dust separation and a line 33 to begin with into the converter 14. The flue gas enters at a temperature of about 400° C. on the same side into the converter 14 as the material to be processed, flows around a closed processing unit for the sewage sludge arranged in its interior and leaves the converter 14 again through a line 34 at a temperature of about 250° C. The combustion gas flow in the converter 14 occurs in an analogous manner as in the drying units 5, which will be described later.

Through a line 34 which can possibly be connected with the line 33 by a bypass flap 35 the flue gas reaches then the first of the drying units 5 of the drying stage T through which it flows in a manner which will be explained later. In each of the drying units 5 the temperature of the flue gas is reduced magnitude-wise by 50° C., so that, when it leaves the drying stage T at the end, it has only a temperature of about 50° C. The waste gas is then fed to a conventional waste gas cleaning device through a waste gas line 36.

One drying unit of the drying stage T is shown at an enlarged scale in longitudinal- or cross-section in FIGS. 2 and 3. The drying unit 5 consists to begin with of an internal pipe 40 where a conveyor worm 42 revolves driven by a drive 41, for instance an electric motor. The conveyor worm 42 consists of an external annularly-shaped helix 43 (FIG. 3) which is fastened to a shaft 45 by radial webs 44; the shaft 45 is shown here as a hollow shaft. The design of the helix 43 as a hollow helix has the advantage that the commodity to be processed can free fall and can be transported in the hollow space formed in the internal pipe 40. The commodity to be processed is supplied to the internal pipe 40 on the one side in free fall through a pipe stub 46 and is drawn off at the other end through a pipe stub 47, in order to again in free fall pass through the next drying unit.

The internal pipe 40 is surrounded by an outer jacketing pipe 48 across the largest portion of its length. An annularly-shaped helix 50 is located in the annular space 49 between the internal pipe 40 and the outer jacketing pipe 48 by means of which a helically shaped annular channel 51 is formed in the annular space 49. The flue gas from the cylindrical rotary kiln 24 is introduced as combustion gas into this annular channel 51 parallel to the conveyance direction of the commodity to be processed. This occurs through a pipe stub 52 as input and a pipe stub 53 as output or removal.

I claim:

1. A method for processing sewage sludge, wherein the sewage sludge is first dried in successive processing steps, thereupon subjected to conversion under anaerobic conditions at approximately 250° C. to 350° C. and finally calcinated at at least 1250° C., comprising the steps of carrying out all processing steps including the step of conveying the commodity to be processed between the individual processing steps successively in continuous passage in a closed system, from which only the vapors are removed in the drying stage (T) and the conversion gas in the conversion stage (K) and both are condensed;

utilizing the heat contained in the flue gas generated during the calcination for supplying heat to the conversion stage (K) and the drying stage (T);

conducting the flue gas flow parallel to and in the same direction as the conveyance direction of the commodity to be processing stage the highest flue gas temperature for heating is available.

2. A method according to claim 1, comprising maintaining a slight underpressure in the entire processing and conveyance system so that no reaction gases can escape to the outside.

3. A method according to claim 1, comprising positively conveying the commodity to be processed for instance by means of worm conveyors on the conveyance path between the individual processing stages.

4. An apparatus for processing sewage sludge, comprising a charging station (A) for charging mechanically predrained sewage sludge;

a drying stage (T) with at least one tubular-shaped treatment unit heatable by heating gas and having devices for continuous conveyance of the treatment commodity;

a conversion stage (K) having at least one tubular shaped treatment unit heatable by heating gas and further having devices for continuous conveyance of the treatment commodity;

a sintering stage (S) having a cylindrical rotary kiln with an escape for the slag;

closed lines for continuous conveyance of the treatment commodity in between the charging station (A), the treatment units of the drying stage (T), the conversion stage (K) and the cylindrical rotary kiln of the sintering stage (S);

lines for conveying the flue gas obtained in the sintering stage (S) as hot gas to the treatment units of the conversion stage (K) and subsequently to those of the drying stage (T); and a line (T) for conducting away the vapors from the drying stage (T) to a condensor (8) and a line (16) for carrying the conversion gas from the conversion stage (K) to a condenser (17).

5. Arrangement according to claim 4, comprising a device for mechanical dehydration of the sewage sludge upstream of the drying stage (T).

6. Arrangement according to claim 4 or 7, comprising positively acting conveyors for instance twin worm conveyors for transporting the commodity to be processed between the processing stages.

7. Arrangement according to claim 4 comprising several processing units (5) consecutively arranged in the dry step (T) and respectively connected with each other at their ends for conveying the commodity to be processed.

8. Arrangement according to claims 4, 6 or 7, comprising each processing unit (5) of the drying stage (T) comprising internal conveying pipe (40) for the commodity to be processed, where a conveyance worm (42) is rotatably arranged and the conveyance pipe (40) is surrounded by an external jacketing pipe (48) wherein the annularly-shaped hollow space (40) formed between the conveyance pipe (40) and the jacketing pipe (48) can be used as passage for combustion gas.

9. Arrangement according to claim 8, comprising a helically-shaped heating channel (51) formed in the annularly-shaped hollow space (49) by means of an annularly-shaped helix (50) terminating said hollow space in transverse direction.

10. Arrangement according to claim 8, comprising the conveyance worm (42) consisting of an annularly-shaped helix (43), fastened by radial webs (44) to a centrally driven axis (45).

11. Arrangement according to claim 8, comprising a heat insulating jacketing arranged at the external circumference area of the faceting pipe (48).

12. Arrangement according to claim 4 or 7, comprising the processing units (5) combined into a drying battery (4) with respectively reversed conveying directions.

* * * * *